United States Patent Office 3,117,673
Patented Jan. 14, 1964

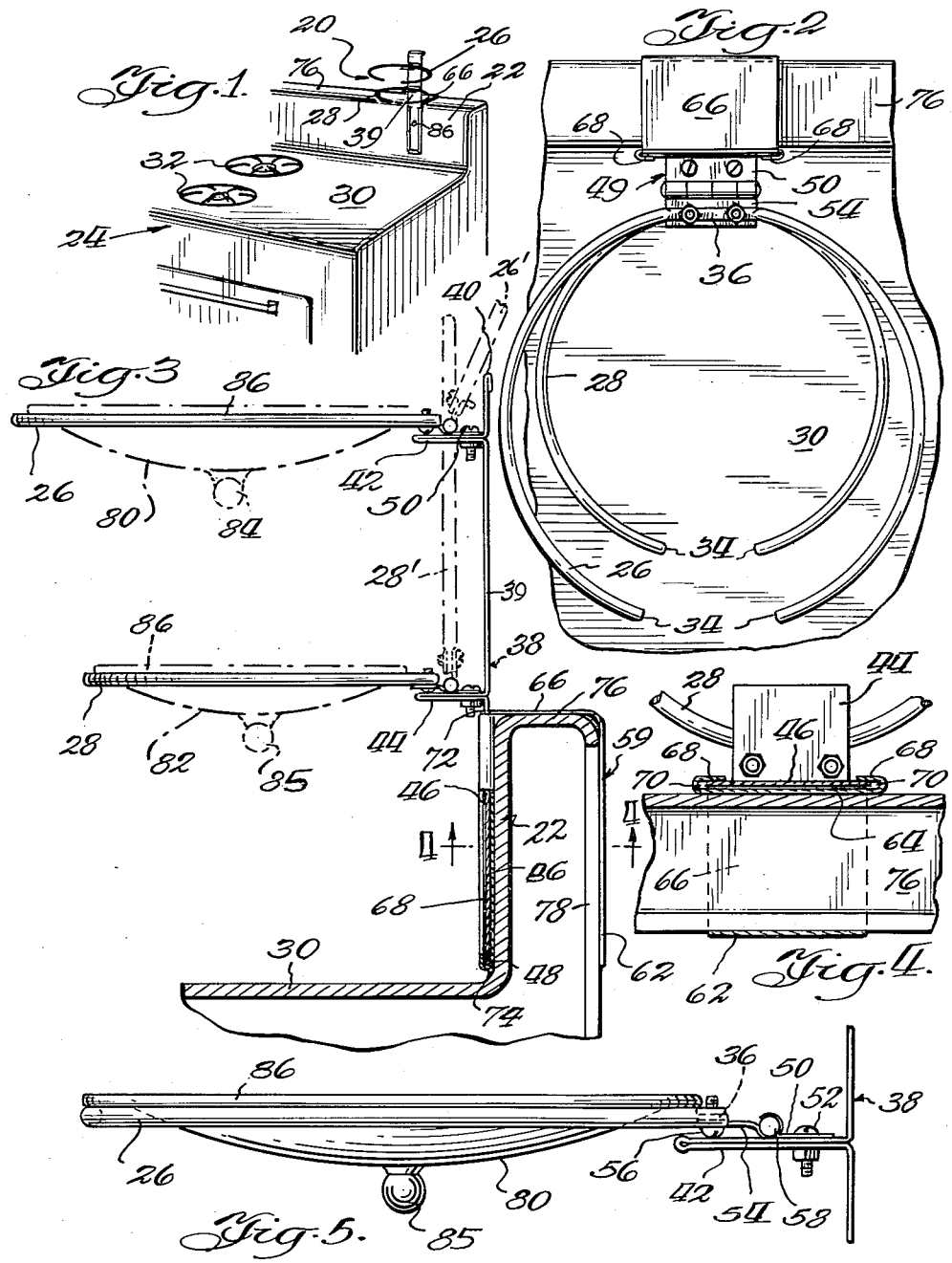

3,117,673
COLLAPSIBLE RACK FOR POT COVERS
Alvera A. Hatfield and Charles L. Hatfield, both of 14832 Champlain Ave., Dolton, Ill.
Filed Aug. 3, 1962, Ser. No. 214,618
2 Claims. (Cl. 211—99)

This invention relates generally to rack structures for pot covers and more particularly, relates to a collapsible rack for pot covers adapted to be mounted vertically oriented on a support element, such as, a cooking range or wall adjacent the cooking area.

In our said co-pending application, there is disclosed and claimed a collapsible rack for supporting pot covers of cooking vessels, said rack adapted to be supported on the cooking range or upon any work surface immediately adjacent the cooking area at a convenient location and readily available to the user, but which can be collapsed to a very small assembly to enable storage of the rack out of sight. Said rack is capable of holding a plurality of pot covers in inverted condition and therefore, is constructed to permit access to the handle of the pot cover without risk of touching the body of the cover both for placing the cover on the rack and for removing the same. This advantage is especially important where the user must insert his fingers below the body of a cover supported on the rack with another cover or for removing one of the covers on the rack. The invention of said co-pending application was intended, primarily, to be used on a horizontal surface adjacent the cooking range or on the cooking range and was to be stored out of sight when not in use.

The herein invention embodies all of the advantageous features of the rack structure of said co-pending application insofar as the functions thereof are concerned with supporting the pot covers. In addition, however, the rack structure embodying the invention is intended to be mounted vertically oriented either on a cooking range or upon a wall adjacent the cooking area. Further, said rack structure has pivotally mounted pot cover supporting means for holding a plurality of pot covers in inverted condition within ready reach of the user, said means being pivoted to an out-of-the-way or stored position when the rack is not being used.

Accordingly, the major object of the invention is to provide a collapsible rack for pot covers capable of achieving the foregoing additional functions described as well as the pot holding functions of the rack structure of said co-pending application.

An important object of the invention is to provide a rack for pot covers having novel mounting means for securing the rack vertically oriented adjacent a cooking area and pivotally mounted pot cover supporting means capable of being selectively moved between a first position horizontally oriented for supporting the pot covers and a second collapsed or stored position wherein said supporting means are vertically oriented in a stored condition.

Another object of the invention is to provide a rack structure of the character described having an inverted U-shaped bracket for removably installing said rack on the splash plate or wall at the rear of a cooking range of the conventional standing range as distinguished from a built-in or counter type range.

Another object of the invention is to provide a rack of the character described having a mounting means for installing the rack on a wall adjacent a cooking range, said mounting means capable of being cooperably assembled also with said bracket.

Further, objects of the invention reside in providing a rack of the character described in which said pivotal pot cover supporting means comprise metal wire members of generally C-shaped configuration to permit desired access to the handles of the covers; which rack is convenient and easy to install and use; which is economical to manufacture; which is compact and attractive; and which can be used without scratching or marring the upper polished surfaces of the pot covers.

The foregoing and other objects of the invention will become apparent as the description thereof ensues, the several embodiments of the invention being described in detail in the specification and illustrated in the accompanying drawing. Minor variations in structural features thereof may occur to the skilled artisan without sacrificing any of the advantages or circumventing any of the basic premises of the invention.

In the drawing, where the same reference characters are utilized to designate the same or similar parts throughout the several figures of the drawing:

FIG. 1 is a fragmentary perspective view of a self-standing cooking range having the rack for pot covers embodying the invention installed thereon.

FIG. 2 is a fragmentary top plan view of the rack installation of FIG. 1.

FIG. 3 is a fragmentary vertical sectional view taken through the cooking range of FIG. 1 and showing said rack in side elevational view with pot covers supported thereon illustrated in phantom outline, portions of the rack being broken away to show details.

FIG. 4 is a fragmentary sectional view taken along the line 4—4 of FIG. 3 and in the general direction indicated.

FIG. 5 is an enlarged, fragmentary side elevational view of the said rack showing one of the pot cover supporting means with a pot cover supported thereon.

Referring now to the drawing, the collapsible rack embodying the invention is designated generally by the reference character 20. As illustrated in FIG. 1, said rack 20 is vertically supported on the upstanding splash plate 22 provided at the rear of a conventional self-standing cooking range shown partially at 24. As will be explained hereinafter, the rack 20 also is capable of being mounted on a wall adjacent a cooking area which may be provided either by a cooking range such as the range 24 or a built-in or counter-top type cooking range which may not have an upstanding splash plate 22 for installing the rack 20 in the manner shown in FIG. 1. Accordingly, the rack 20 may be considered to be capable of being installed for use substantially universally with any type of cooking range currently in use. As seen in FIG. 1, the rack 20 has a pair of pot cover supporting members 26 and 28 horizontally oriented and vertically spaced apart above the work surface 30 and to one side of the row of burners 32 of the range. It should be appreciated that the location of the work surface 30 of the range varies between models of different manufacturers so that the burners 32 and work surface 30 may be located differently with respect to one another from that shown in FIG. 1. For instance, in some models of cooking ranges, the work surface 30 may be located between a row of burners however, satisfactory operation of the rack 20 is not adversely affected thereby.

Referring to FIGS. 2 and 3, the pot cover support members 26 and 28 are substantially identical in consrtuction although different in size, the member 26 being larger than the member 28 for holding a larger pot cover. Each of said members is formed, preferably, from a single length of metal tubing, such as aluminum bent to an arcuate shape. The opposite ends 34 of each support member are separated or spaced apart so that in the plan view of FIG. 2, each support member may be considered to have a substantially C-shaped configuration. The arcuate segment 36 of each member directly opposite the spaced apart ends 34 thereof is flattened for facilitating attaching the support members 26 and 28 on the rack.

The members 26 and 28 are mounted on a standard designated 38 in FIG. 3. The standard 38 may be formed from an integral strip 39 of sheet metal as illustrated or may be fabricated from several parts secured together to achieve the desired structural features thereof. Spaced inwardly from the upper end 40 thereof, the standard 38 has a flange or ledge 42 substantially perpendicular thereto. The flange 42 may be formed by suitable return-bending of the strip 39 at the desired location along the length thereof. Spaced from the flange 42 along the length of the standard is a second flange or ledge 44 which can be formed in the same manner as flange 42. Standard 38 has a straight, flat extension or leg 46 protruding downwardly beyond the flange 44, the bottom end 48 of said extension being spaced from the flange 44 a substantial distance. The extension 46 lies generally in the same plane as the sheet metal strip 39.

The pot cover support members 26 and 28 are pivotally mounted on the upper surfaces of the flanges or ledges 42 and 44 respectively in substantially the same manner so that a description of the manner of installation of the support member 26 will suffice also for the member 28. Referring to FIG. 5, the support member 26 is pivotally mounted on the flange 42 by means of a hinge 49, one leaf 50 of the hinge being bolted to the flange 42 adjacent the standard 38 as indicated at 52. The second leaf 54 of the hinge is bolted to the flattened arcuate segment 36, the heads 56 of the bolts being located between the flange 42 and the leaf 54. The pivot pin 58 of the hinge is horizontally oriented transversely across the flange 42 so that the axis of pivot of the hinge also is horizontally oriented and is spaced from and parallel with the plane of standard 38.

As seen in FIG. 5, the support member 26 is extended outwardly in a plane substantially parallel to the ledge 42 and perpendicular to the standard 38. Thus, the member 26 is horizontally disposed in operative position ready to receive a pot cover thereon. The head 56 protruding downwardly from the hinge leaf 54 engages against the flange 42 and thereby functions as both a stop member and a holding means for retaining the support member 26 horizontally arranged perpendicular to the standard 38 and in a plane slightly spaced above the plane of the ledge 42.

Referring to FIG. 3, the support members 26 and 28 can be pivoted upwardly to a second position which is a stored or collapsed condition therefor when not in use. These stored positions are indicated in broken outline for each of the support members by the reference characters 26′ and 28′ respectively. The member 26 is supported against the upper end 40 of the standard in its stored position 26′ whereas the member 28 is engaged against the member 26 and arranged substantially parallel with the standard 38 in its stored position 28′. This is possible by reason of the smaller diameter or size of the member 28 which is spaced below the member 26 on the standard.

To install the rack 20 on a range 24, there is provided a bracket 59 of generally inverted U-shaped configuration. The mounting bracket 59 is comprised of a pair of legs 62 and 64 connected at the upper ends thereof by a web 66. The bracket is formed preferably of sheet metal and the legs 62 and 64 may be of similar length and approximately the height of splash plate 22 above surface 30. The opposite longitudinal edges of the leg 64 have inwardly turned flanges 68 spaced from and substantially parallel to the leg 64 to provide a pair of tracks or channels 70 which are open at the upper ends 72 thereof and closed at the bottom ends 74 thereof. The length of the web 66 is selected so that said bracket can slide over the splash plate 22 in a snug fit. As seen in FIG. 3, the bracket is installed so that splash plate 22 is sandwiched between the legs 62 and 64 thereof with the connecting web 66 supported on the upper end face 76 of said splash plate. The leg 62 is engaged against the rear wall 78 of the range and the leg 64 is engaged against the front face of the splash plate. In this position, the depending extension 46 of the standard 38 can slide into the channels 70 through the open upper ends 72 thereof until the bottom end 48 thereof abuts against the closed ends 74 of said channels. The relative dimensions of the extension 46 and the distance between facing edges of the flanges are selected so that the extension 46 can be frictionally engaged in the channels 70 between flanges 68 and the leg 64. Thus, the rack 20 is vertically supported on the splash plate 22 of the range and extending upwardly beyond the splash plate. The lengths of the legs 62 and 64 and extension 46 are selected to provide adequate bearing surfaces for supporting rack 20 in a vertically stable position on splash plate 22.

Referring to FIG. 3, a pot cover 80 is shown in broken outline supported on member 26 and a pot cover 82 is shown in broken outline supported on member 28. Each pot cover has a handle or knob 84 and it will be seen that each of the covers is supported in an inverted position so that the knob or handle 84 thereof points downwardly and is located below the support member on which the pot cover is supported. It will be seen that the diameter of the peripheral rim 85 of pot cover 80 is larger than the diameter of the support member 26. Likewise, the cover 82 is larger than support member 28. In each instance, the cover 80 or 82 will have a rim 85 which can be engaged upon the support member to hold the cover thereon.

The support members 26 and 28 are vertically spaced apart a sufficient distance to permit a person cooking to insert his hand between said members and grasp the handle 84 of cover 80 without touching either of the covers on the rack, as seen in FIG. 3. The same clearance space is available between cover 82 and the work surface 30 of the range. These clearance spaces permit both placing of the covers on the support members inverted and their removal from the support members without touching parts of the respective covers. This avoids possible burns due to hot covers on the rack. Further, the spaced apart ends 34 of the support members permit the person cooking to reach inwardly past said ends for placing a cover in inverted condition on a support member.

It will be appreciated that the standard 38 is removable from the bracket member engaged upon splash plate 22 by withdrawing the extension 46 from the channels 70. Because the extension 46 is flat, openings 86 may be provided therein through which suitable fasteners (not shown) can be extended for mounting the rack 20 on a wall, detached from said mounting bracket. This has not been shown because it is believed apparent from the disclosure of the flat extension 46 seen in FIG. 3 which would bear against a wall directly in the same manner as it bears against the leg 64 of the mounting bracket as illustrated in FIG. 4.

It is believed that the invention has been sufficiently described to enable the skilled artisan to understand and practice the same. Minor variations are contemplated which do not reach outside the basic principles of the invention. For instance, manner of pivotally mounting the support members 26 and 28 on the flanges 42 and 44 respectively and the manner of providing said flanges may be altered from that shown in the embodiments disclosed. Also, the standard may be dimensioned for either one or more than two pot cover holding means, such as three or four.

The invention has been distinctly pointed out in the claims hereto appended in language intended to be broadly construed commensurate with the progress in the arts and sciences contributed thereby.

What is desired to be secured by Letters Patent is:

1. A rack for supporting pot covers which comprises, a standard having at least one flange extending outwardly intermediate the opposite ends thereof; a pot cover holding member pivotally mounted on said flange and movable between a first position horizontally oriented and a second position vertically oriented, said standard having an extension extending below said flange for mounting the standard in a vertical disposition said extension having a U-shaped bracket removably secured thereto for mounting the rack on the splash plate of a cooking range.

2. A rack as described in claim 1 in which one leg of said bracket has opposite marginal inturned flanges providing channel formations adapted to frictionally engage the extension therein.

References Cited in the file of this patent

UNITED STATES PATENTS

| | | |
|---|---|---|
| 958,131 | Jackson | May 17, 1910 |
| 1,079,192 | Sowden | Nov. 18, 1913 |
| 2,010,203 | Schuiling | Aug. 6, 1935 |
| 2,049,593 | Schabinger | Aug. 4, 1936 |
| 2,662,717 | Johnson | Dec. 15, 1953 |
| 2,765,397 | Harris | Oct. 2, 1956 |
| 2,903,225 | Weinstein | Sept. 8, 1959 |